United States Patent [19]
Momose et al.

[11] Patent Number: 5,086,625
[45] Date of Patent: Feb. 11, 1992

[54] AIR-CYCLE AIR CONDITIONING SYSTEM

[75] Inventors: Yutaka Momose; Shigeyoshi Tabata, both of Anjo; Katsuhiro Mori, Aichi, all of Japan

[73] Assignee: Aisin Seiki Kabushiki Kaisha, Kariya, Japan

[21] Appl. No.: 584,738

[22] Filed: Sep. 19, 1990

[30] Foreign Application Priority Data

Sep. 21, 1989 [JP] Japan .................................. 1-245988

[51] Int. Cl.$^5$ .............................................. F25B 9/06
[52] U.S. Cl. ......................................... 62/172; 62/236; 62/323.1; 62/402
[58] Field of Search .................. 62/133, 230, 236, 172, 62/86, 87, 401, 402, 243, 323.1

[56] References Cited

U.S. PATENT DOCUMENTS

| | | | |
|---|---|---|---|
| 2,898,745 | 8/1959 | Weisel | 62/172 |
| 3,052,106 | 9/1962 | Sampietro et al. | 62/172 X |
| 3,699,777 | 10/1972 | Rannenberg | 62/172 |

Primary Examiner—Harry B. Tanner
Attorney, Agent, or Firm—Burns, Doane, Swecker & Mathis

[57] ABSTRACT

An air-cycle air conditioning system comprises a first turbine disposed in an exhaust passage of a prime mover and driven by the energy of exhaust gases, a first compressor placed in coaxial relation to the first turbine and rotatable in response to the operation of the first turbine so as to intake and compress an air, a second turbine coupled to an outlet end of the first compressor through a first line and rotatable by the energy of a compressed air from the first compressor so as to expand and cool the compressed air, a first heat exchanger disposed in the first line and effecting heat exchange between the compressed air and an outside air, a second heat exchanger connected to the second turbine through a second line and effecting heat exchange between the air supplied from the second turbine and an air supplied from a fan, a second compressor placed in coaxial relation to the second turbine and rotatable in response to the operation of the second turbine so as to intake and compress an air, an auxiliary burner capable of burning the air supplied from the second compressor and feeding the resultant exhaust gases to the first turbine, a load sensor for detecting load condition of the prime mover, and a controller for permitting the auxiliary burner to feed the exhaust gases to the first turbine when the load sensor detects that the prime mover runs on low load.

2 Claims, 1 Drawing Sheet

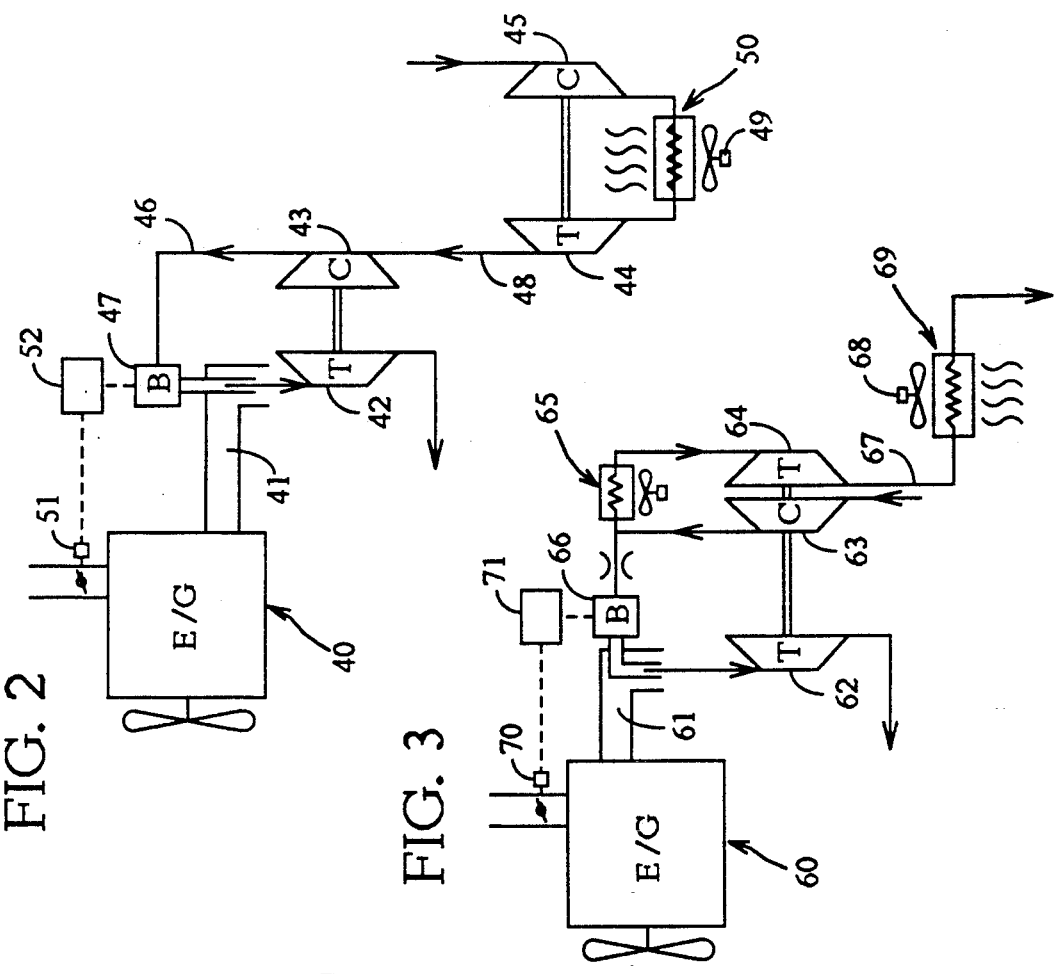
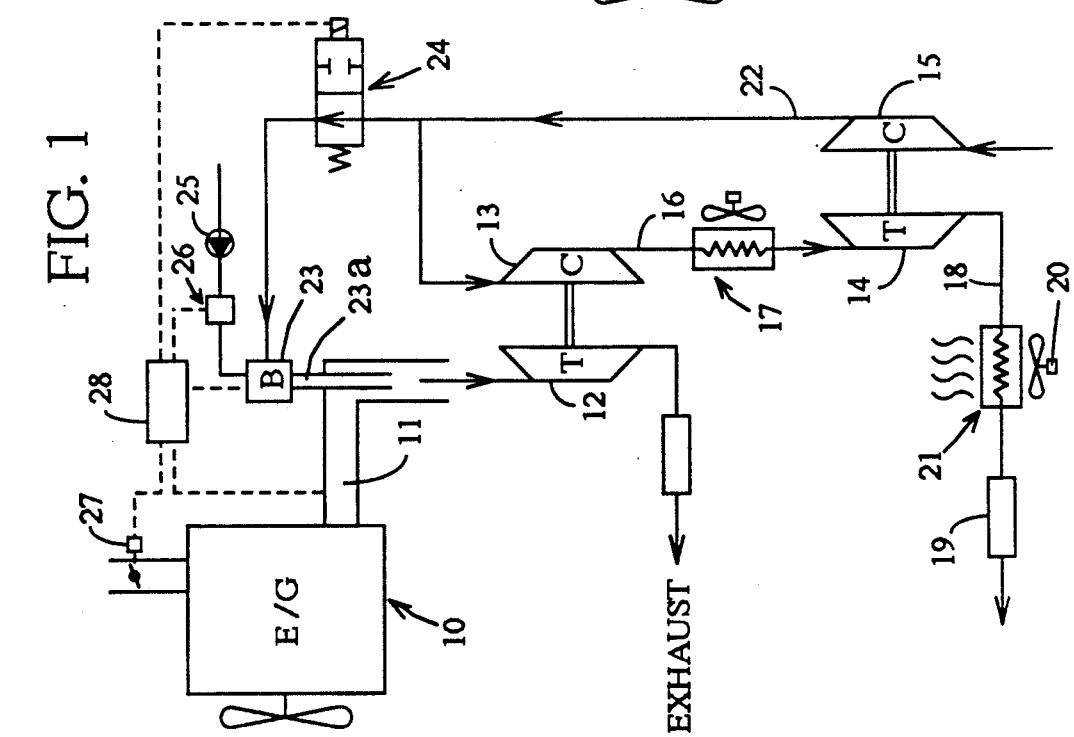
FIG. 2
FIG. 3
FIG. 1

AIR-CYCLE AIR CONDITIONING SYSTEM

BACKGROUND OF THE INVENTION

1. Field of the Invention

The present invention relates to an air-cycle air conditioning system for use, particularly, in an automotive vehicle.

2. Description of the Related Art

A vapor-cycle air conditioning system has been widely used in motor vehicles. This system utilizes a coolant such as freon so as to obtain a cooling air. Various attempts have hitherto been made to improve such a system.

In connection with environmental disruption, it has recently been found that freon may damage an ozone layer in the Earth and result in the rise of temperature. Thus, there is an increasing need for an air conditioning system with an alternative coolant.

Attention is now paid to an air-cycle air conditioning system as an alternative air conditioner. This system has been used in an aircraft and uses a bleed air pressure in an engine or an auxiliary power unit (APU). A cooling turbine expands and cool the air so as to provide a cooling air. The aircraft is not subject to a substantial change in the engine load during operation. Also, there is a little change in the bleed air pressure. This enables a constant supply of cooling air. When such an air-cycle air conditioning system is used in an automotive vehicle, an additional drive source is required to drive a cooling turbine. Such a cooling turbine can be driven by energy of exhaust gases from a vehicle engine. However, engine load is likely to vary during operation of the vehicle engine. This results in the change of energy of the exhaust gases. A constant supply of cooling air is not guaranteed.

SUMMARY OF THE INVENTION

Accordingly, it is an object of the present invention to provide an air-cycle air conditioning system for use in an automotive vehicle, which can provide a constant supply of cooling air despite changes in engine load.

In order to achieve the foregoing object, there is provided an air-cycle air conditioning system wherein a turbine is driven by the energy of exhaust gases from a prime mover to expand and cool an air so as to provide a cooling air, characterized by an auxiliary burner for providing an auxiliary energy when the prime mover runs on low load.

According to a preferred embodiment of the invention, an air-cycle air conditioning system comprises a first turbine disposed in an exhaust passage of a prime mover and driven by the energy of exhaust gases, a first compressor placed in coaxial relation to the first turbine and rotatable in response to the operation of the first turbine so as to intake and compress an air, a second turbine coupled to an outlet end of the first compressor through a first line and rotatable by the energy of a compressed air from the first compressor so as to expand and cool the compressed air, a first heat exchanger disposed in the first line and effecting heat exchange between the compressed air and an outside air, a second heat exchanger connected to the second turbine through a second line and effecting heat exchange between the air supplied from the second turbine and an air supplied from a fan, a second compressor placed in coaxial relation to the second turbine and rotatable in response to the operation of the second turbine so as to intake and compress an air, an auxiliary burner capable of burning the air supplied from the second compressor and feeding the resultant exhaust gases to the first turbine, a load sensor for detecting load condition of the prime mover, and control means for permitting the auxiliary burner to feed the exhaust gases to the first turbine when the load means detects that the prime mover runs on low load.

The second compressor is coupled to said auxiliary burner through a third line, and the third line has a branch coupled to an inlet end of the first compressor. A valve may be disposed in the third line between the auxiliary burner and the branch and selectively movable between a first operative position where the third line is communicated and a second operative position where the third line is not communicated. The above-mentioned valve is held in its second operative position by the control means when the load sensor detects that the prime mover runs on low load.

With the invention, when the load sensor detects that the prime mover runs on medium to high load, the control means is active to prevent burning in the auxiliary burner. However, the level of energy of exhaust gases is high whereby first turbine is rotated at a high speed. This causes the first compressor to rotate at a high speed so as to intake and compress an air. The air thus compressed is then brought into contact with the outside air in the first heat exchanger. The air thus cooled as a result of heat exchange is used to rotate the second turbine. In the second turbine, the air is expanded and cooled. The expanded air is then supplied to the second heat exchanger and brought into contact with an air generated by the fan so as to cool the same.

When the prime mover runs on low load, the level of energy of exhaust gases is low, and the first turbine can not be rotated at a high speed. To this end, the control means is active to permit the auxiliary burner to effect burning so as to feed exhaust gases to the first turbine when the load sensor detects such load condition of the prime mover. The exhaust gases, together with those from the prime mover, will cause the first turbine to run at a high speed. As a result, a cooling air can be obtained in the second heat exchanger like when the prime mover runs on medium to high load.

BRIEF DESCRIPTION OF THE DRAWINGS

A better understanding of the present invention may be made by reference to the following description of preferred embodiments when taken in conjunction with the accompanying drawings, in which:

FIG. 1 is a schematic view of an air-cycle air conditioning system made according to one embodiment of the present invention; and FIGS. 2 and 3 are schematic views of air-cycle air conditioning systems made according to different embodiments of the present invention.

DESCRIPTION OF THE PREFERRED EMBODIMENTS

The present invention will now be described by way of example with reference to the drawings.

With reference to FIG. 1, reference numeral 10 designates an internal combustion engine for use in, for example, a automotive vehicle. The engine 10 has an exhaust passage 11 within which a first turbine 12 is disposed. The first turbine 12 is driven for rotation by energy of exhaust gases in the exhaust passage 11. A first compressor 13 is placed in coaxial relation to the first turbine 12 and rotated in response thereto. The first compressor 13 is active to compress an air received from a second compressor 15 as will be described hereinafter.

The outlet end of the first compressor 13 is connected to the inlet end of a second turbine 14 via a first line 16. Disposed in the first line 16 between the first compressor 13 and the second turbine 14 is a first heat exchanger 17 wherein heat exchange takes place between the compressed air from the first compressor 13 and an ambient air. The first heat exchanger 17 is to cool the compressed air and is preferably mounted in the front portion of the vehicle (for example, in front of a radiator in its cooling system).

The second turbine 14 is driven by energy of the compressed air as cooled by the first heat exchanger 17 and active to expand and cool the compressed air. The outlet end of the second turbine 14 is connected to a muffler 19 through a second line 18 and communicated with the outside air. Disposed in the second line 18 between the second turbine 14 and the muffler 19 is a second heat exchanger 21 wherein heat exchange takes place between the expanded and cooled air from the second turbine 14 and an air from a fan 20 to provide a cooling air.

A second compressor 15 is disposed in coaxial relation to the second turbine 14 and rotated in response thereto so as to compress the air. The outlet end of the second compressor 15 is connected to an auxiliary burner 23 through a third line 22. A solenoid valve 24 is disposed in the third line 22 and selectively movable between a first position where the third line 22 is communicated and a second position where the third line 22 is not communicated. When a throttle sensor 27 detects that the throttle is opened at an angle smaller than a predetermined angle, and the internal combustion engine 10 runs on low load, the solenoid valve 24 is held in its first position. On the other hand, when the throttle sensor 27 detects that the throttle is opened at an angle greater than a predetermined angle, and the internal combustion engine 10 runs on medium to high load, the solenoid valve 24 is held in its second position. Such a change in the position of the solenoid valve 24 is effected under the control of a control circuit 28.

The auxiliary burner 23 is of a conventional type and active to burn an air supplied through the third line 22 and a fuel supplied by a fuel pump 25 under the control of a fuel valve 26. The auxiliary burner 23 has an exhaust pipe 23a coupled to the exhaust line 11, so that the burned exhaust gases can be supplied to the first turbine 12. The fuel valve 26 cooperates with the fuel pump 25 so as to supply a fuel to the auxiliary burner 23 when the throttle sensor 27 detects that the throttle is opened at an angle smaller than a predetermined angle, and the internal combustion engine 10 runs on low load. In contrast, it prevents supply of the fuel from the fuel pump 25 to the auxiliary burner 23 when the throttle sensor 27 detects that the throttle is opened at an angle greater than a predetermined angle, and the internal combustion engine 10 runs on medium to high load. As in the solenoid valve 24, the fuel valve 26 is operated under the control of the control circuit 28. An ignition system (not shown) is operatively connected to the auxiliary burner 23 and also, controlled by the control circuit 28.

Operation of the air-cycle air conditioning system thus made will now be described.

First, when the throttle is opened at an angle greater than a predetermined angle, and the internal combustion engine 10 runs on medium to high load, the control circuit 28 is operative to move the solenoid valve 24 toward its second position. This prevents a supply of air to the auxiliary burner 23. Also, the fuel valve 26 prevents the fuel pump 25 from supplying a fuel. As a result, no burning of the air/fuel mixture takes place in the auxiliary burner 23. On the other hand, the exhaust gases from the internal combustion engine 10, when running on medium to high load, provides a high level of energy whereby the first turbine 12 is rotated at a high speed. The first compressor 13 is then rotated at a high speed and active to compress an air received from the second compressor 15 through the third line 22. The compressed air is cooled by the first heat exchanger 17 as a result of contact with the ambient air. This air is used to drive the second turbine 14 and thereby expanded and cooled. The expanded air is then supplied to the second heat exchanger 21 whereby heat exchange takes place between the expanded air and an air from the fan 20 so as to provide a cooling air.

When the throttle is opened at an angle smaller than a predetermined angle, and the internal combustion engine 10 runs on low load, the energy of exhaust gases is low. Consequently, the first turbine 12 can not be rotated at a high speed. To this end, if the throttle sensor 27 detects that the internal combustion engine 10 runs on low load, then the control circuit 28 is active to move the solenoid valve 24 toward its first position and control the fuel valve 26 to permit the fuel pump 25 to supply a fuel to the auxiliary burner 23. The auxiliary burner 23 is then active to burn a mixture of air and fuel. The resultant exhaust gases as well as those gases from the internal combustion engine 10 are supplied to the first turbine 12. This causes the first turbine 12 to rotate at a high speed, even if the internal combustion engine 10 runs on low load. As in the case where the internal combustion engine 10 runs on medium to high load, a cooling air can be obtained in the second heat exchanger 21.

FIGS. 2 and 3 show air-cycle air conditioning systems made according to different embodiments of the present invention.

As shown in FIG. 2, an internal combustion engine 40 includes an exhaust passage 41 within which a first turbine 42 is disposed. The first turbine 42 is driven for rotation by the energy of exhaust gases in the exhaust passage 41. A first compressor 43 is placed in coaxial relation to the first turbine 42 and is rotated in response thereto. The first compressor 43 is active to compress an air received from a second compressor 45 through a line 48. A line 46 is used to connect the outlet end of the first compressor 43 and an auxiliary burner 47.

A second turbine 45 is placed in coaxial relation to the second compressor 44 and rotated in response thereto so as to expand and cool an air. This expanded/cooled air is supplied to a second heat exchanger 50 wherein heat exchange takes place between the expanded/cooled air and an ambient air. A cooling air, as a result of heat exchange, is then fed to the second compressor 44.

In the illustrated embodiment, when a throttle sensor 51 detects that the internal combustion engine 10 runs on medium to high load, then a control circuit 52 is active to control the auxiliary burner 47 so as not to effect burning (An air is not supplied from the first compressor 43 to the auxiliary burner 47, and a fuel is not fed from a fuel pump (not shown in FIG. 2) to the auxiliary burner 47, either). In this case, the energy level of the exhaust gases is high, so that the first turbine 42 can not be rotated at a high speed. Upon the rotation of the first turbine 42, the first compressor 43 is driven for rotation at a high speed and intakes an air from the second turbine 45 through the heat exchanger 50, the second compressor 44 and the line 48 for compression purposes. The intake action of the first compressor 43 causes the second compressor 44 to rotate. Simultaneously, the second compressor 45 is so driven as to compress and thus cool the air. This expanded and cooled air is then fed to the heat exchanger 50 so as to contact an air from the fan 49. This results in the provision of a cooling air.

When the internal combustion engine 40 runs on low load or the energy level of the exhaust gases is low, the first turbine 42 can not be rotated at a high speed. To this end, when the throttle sensor 51 detects that the internal combustion engine 40 runs on low load, the control circuit 52 is operative to permit burning in the auxiliary burner 47 (an air and a fuel are fed to the auxiliary burner 47 from the first compressor 46 and the fuel pump, respectively). As a result, the exhaust gases are fed to the first turbine 42 from both the auxiliary burner 47 and the internal combustion engine 40. This allows the first turbine 42 to rotate at a high speed even if the internal combustion engine runs on low load. The second compressor 44 and the second turbine 45 can be rotated in the same manner as in the case where the engine runs on medium to high load, whereby the heat exchanger 50 can provide a cooling air.

In the illustrated embodiment shown in FIG. 3, an internal combustion engine 60 includes an exhaust passage 61 within which a first turbine 62 is disposed and driven by the energy of exhaust gases. Disposed in coaxial relation to the first turbine 62 are a first compressor 63 and a second turbine 64. The first compressor 63 is rotated in response to the operation of the first turbine 42 so as to intake and compress an air. This compressed air can be simultaneously supplied both to the inlet end of a second turbine 64 through a heat exchanger 65 and an auxiliary burner 66.

The second turbine 64 is active to expand and cool the compressed air as cooled in the heat exchanger 65 as a result of contact with the outside air and connected at its outlet end to a heat exchanger 69 through a line 67. The compressed air from the second turbine 64 is brought into contact with an air supplied from a fan 68 to provide a cooling air.

In the illustrated embodiment, when the internal combustion engine 60 runs on medium to high load, a control circuit 71 is operative to control the auxiliary burner 60 so as not to effect burning (or to prevent the first compressor 63 from feeding an air to the auxiliary burner 66, and a fuel pump from feeding a fuel thereto). In this case, the first turbine 62 is rotated at a high speed since the energy level of exhaust gases discharged from the internal combustion engine 60 is high. Upon the rotation of the first turbine 62, the first compressor 63 is rotated at a high speed so as to intake and compress an air. At the same time, the second turbine 64 is rotated at a high speed so as to expand and cool the compressed air as cooled in the heat exchanger 65. The compressed air is then fed to the heat exchanger 69 and brought into contact with an air generated by the fan 68 so as to provide a cooling air.

When the internal combustion engine 60 runs on low load, the energy level of exhaust gases is low. The first turbine 62 can not be rotated at a high speed. To this end, when a throttle sensor 70 detects that the internal combustion engine 60 runs on low load, the control circuit 70 is operative to permit burning in the auxiliary burner 66 (or to permit the first compressor 63 to supply an air to the auxiliary burner 66, and a fuel pump (not shown) to supply a fuel thereto). In other words, both the auxiliary burner 66 and the internal combustion engine 60 provide exhaust gases to the first turbine 62. The compressed air is supplied from the first compressor 63 to the heat exchanger 65. The compressed air as cooled in the heat exchanger 65 is then supplied to the second turbine 64 whereby it is expanded and thus cooled. Lastly, the compressed air is supplied to the heat exchanger 69 and is brought into contact with an air generated by the fan 68 so as to provide a cooling air. In the illustrated embodiment, when the internal combustion engine 60 runs on low load, the auxiliary burner 66, together with the internal combustion engine 60, feeds exhaust gases to the first turbine 62 so that the first turbine 62 can be rotated at a high speed. Upon rotation of the second turbine 64, the heat exchanger 69 provides a cooling air.

In the illustrated embodiments, the throttle sensors are used as a means for detecting the load condition of the internal combustion engines. Alternatively, there may be provided a means for detecting negative pressure level in an intake manifold and the flow of intake air.

As stated above, the air-cycle air conditioning system of the present invention can be applied to automotive vehicles and the like and provides a constant supply of cooling air despite load changes in the internal combustion engine.

Although the preferred embodiments of the present invention have been described, it is to be understood that the invention is not limited thereto, and various modifications and changes may be made without departing from the spirit of the invention and the scope of the appended claims.

What is claimed is:

1. An air-cycle air conditioning system comprising the combination of:
   a first turbine disposed in an exhaust passage of an internal combustion engine and driven by energy of exhaust gases from said internal combustion engine;
   a first compressor placed in coaxial relation to said first turbine and rotatable in response to operation of said first turbine so as to intake and compress air;
   a second turbine coupled to an outlet end of said first compressor through a first line and rotatable by energy of compressed air from said first compressor so as to expand and cool the compressed air;
   a first heat exchanger disposed in the first line and effecting heat exchange between the compressed air and outside air;
   a second heat exchanger connected to said second turbine through a second line and effecting heat exchange between air supplied from said second turbine and an air supplied from a fan;
   a second compressor placed in coaxial relation to said second turbine and rotatable in response to operation of said second turbine so as to intake and compress air received therein;

auxiliary burner means for burning the air supplied from said second compressor and feeding resultant exhaust gases to said first turbine;

load sensor means for detecting load condition of the internal combustion engine; and control means for controlling said auxiliary burner to feed the resultant exhaust gases to said first turbine when said load sensor means detects that the internal combustion engine is operating on low load.

2. An air-cycle air conditioning system according to claim 1, wherein said second compressor is coupled to said auxiliary burner through a third line, and said third line has a branch coupled to an inlet end of said first compressor, and wherein valve means is disposed in the third line between said auxiliary burner and said branch and is selectively movable between a first operative position where the third line is communicated and a second operative position where the third line is not communicated, said valve means being held in its second operative position by said control means when said load sensor means detects that the prime mover runs on low load.

* * * * *